United States Patent
Baca et al.

(10) Patent No.: US 10,033,683 B2
(45) Date of Patent: *Jul. 24, 2018

(54) SHARING USER INFORMATION WITH PROXIMATE DEVICES

(75) Inventors: Jim Baca, Corrales, NM (US); Tobias Kohlenberg, Portland, OR (US); Burges Karkaria, San Jose, CA (US); Dennis Morgan, Pine Grove, CA (US); David Stanasolovich, Albuquerque, NM (US); Selim Aissi, Beaverton, OR (US); Mark Price, Placitas, NM (US); Alan Ross, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/997,763

(22) PCT Filed: Dec. 28, 2011

(86) PCT No.: PCT/US2011/067591
§ 371 (c)(1),
(2), (4) Date: Jun. 25, 2013

(87) PCT Pub. No.: WO2013/100966
PCT Pub. Date: Jul. 4, 2013

(65) Prior Publication Data
US 2014/0012917 A1    Jan. 9, 2014

(51) Int. Cl.
*G06F 15/16*    (2006.01)
*H04L 12/58*    (2006.01)
(Continued)

(52) U.S. Cl.
CPC ........ *H04L 51/32* (2013.01); *G06F 17/30867* (2013.01); *G06Q 10/101* (2013.01);
(Continued)

(58) Field of Classification Search
CPC ... H04L 63/0492; H04L 67/18; H04L 67/306; H04L 51/32; H04W 4/02; H04W 4/206
See application file for complete search history.

(56) References Cited

U.S. PATENT DOCUMENTS 6,549,768 B1    4/2003    Fraccaroli
6,819,919 B1 *  11/2004   Tanaka ................... G06Q 10/10
                                                342/357.31
(Continued)

FOREIGN PATENT DOCUMENTS

TW    201116035 A    5/2011
TW    201234840 A1   8/2012

OTHER PUBLICATIONS

International Preliminary Report on Patentability dated Jul. 10, 2014 for International Application No. PCT/US2011/067591, 8 pages.
(Continued)

*Primary Examiner* — Tauqir Hussain
*Assistant Examiner* — Kamran Mohammadi
(74) *Attorney, Agent, or Firm* — Christopher K. Gagne (57) ABSTRACT

Embodiments of techniques and systems for sharing user information between proximate devices are described. In embodiments, a first device may identify a physically-proximate device that may receive user information. Upon receiving an indication that a user of the first device may desire to share user information with a user of the second device, a determination may be made as to whether the two users have matching interests. In embodiments, the interest match determination may be made by a separate interest match evaluator. Upon determination of an interest match, the first device may then send a request to share user information to the second device. If a user of the second device approves the request, user information for the user of
(Continued)

the first device may be shared with the user of the second device. Other embodiments may be described and claimed.

21 Claims, 8 Drawing Sheets (51) Int. Cl.
G06Q 50/30 (2012.01)
G06Q 10/10 (2012.01)
H04L 29/06 (2006.01)
H04L 29/08 (2006.01)
H04M 1/02 (2006.01)
H04W 4/02 (2018.01)
H04W 64/00 (2009.01)
G06F 17/30 (2006.01)
H04W 8/24 (2009.01)

(52) U.S. Cl.
CPC ........... *G06Q 50/30* (2013.01); *H04L 65/403* (2013.01); *H04L 67/10* (2013.01); *H04M 1/0202* (2013.01); *H04W 4/02* (2013.01); *H04W 4/023* (2013.01); *H04W 8/24* (2013.01); *H04W 64/00* (2013.01)

(56) References Cited

U.S. PATENT DOCUMENTS

| | | | | |
|---|---|---|---|---|
| 8,650,210 B1* | 2/2014 | Cheng | ............... | G06F 17/30864 707/707 |
| 2008/0154697 A1* | 6/2008 | Guday | ................... | G06Q 10/10 455/414.1 |
| 2008/0285527 A1 | 11/2008 | Sammarco | | |
| 2010/0280904 A1* | 11/2010 | Ahuja | ................... | G06Q 30/02 705/14.58 |
| 2011/0028129 A1* | 2/2011 | Hutchison | ............... | H04M 3/42 455/414.1 |
| 2011/0142016 A1 | 6/2011 | Chatterjee | | |
| 2012/0108206 A1 | 5/2012 | Haggerty | | |

OTHER PUBLICATIONS

International Search Report and Written Opinion dated Sep. 24, 2012 for International Application No. PCT/US2011/067591, 8 pages.
Office Action dated Nov. 21, 2014 for Taiwan Application No. 101143265, 16 pages.
Extended European Search Report dated Jul. 10, 2015 for European Application No. 11878733.2; 5 pages.
Office Action dated Jul. 29, 2016 in Taiwanese Patent Application No. 101143265, and related search report (7 pages, with 6 pages of summarized English translation).
Office Action dated May 12, 2016 in Chinese Patent Application No. 201180076029.2, and related search report (12 pages, with 19 pages of summarized English translation).
Office Action dated Aug. 15, 2016 in U.S. Appl. No. 13/997,763, and related attachments (16 pages).
Communication and Extended European Search Report dated Jul. 10, 2015 in European Patent Application No. 11878733.2 (5 pages).
Office Action dated Nov. 22, 2016 in U.S. Appl. No. 13/997,763, and related attachments.
Office Action dated Dec. 14, 2016 in Chinese Patent Application No. 201180076029.2 (with summarized English translation).
Extended European Search Report dated Sep. 29, 2016 in European Patent Application No. 16172285.5.
Decision of Allowance dated Nov. 15, 2016 in Taiwanese Patent Application No. 101143265.
Office Action dated Mar. 13, 2017 in U.S. Appl. No. 13/997,763, and related attachments.
Office Action dated Apr. 24, 2017 in U.S. Appl. No. 15/088,973, and related attachments.
Office Action dated Dec. 13, 2017 in Chinese Patent Application No. 201180076029.2, related attachments, and summarized partial English translation.
Office Action dated Dec. 19, 2017 in Taiwanese Patent Application No. 105110918, search report, related attachments, and summarized partial English translation.
Office Action dated Sep. 25, 2017 in European Patent Application No. 17164302.6.
Extended European Search Report dated Jun. 6, 2017 in European Patent Application No. 17164302.6.
Office Action dated Dec. 19, 2017 in Taiwanese Patent Application No. 105124321, search report, related attachments, and summarized partial English translation.
Office Action dated Jan. 2, 2018 in U.S. Appl. No. 15/088,973, and related attachments.
Office Action dated Jun. 15, 2017 in Chinese Patent Application 201180076029.2 (and summarized partial English translation).
Extended European Search Report dated Jun. 6, 2017 in European Patent Application 17164302.6.
Office Action dated Jun. 20, 2017 in U.S. Appl. No. 13/997,763 (and related attachments).
Office Action dated Jun. 19, 2017 in U.S. Appl. No. 15/088,973 (and related attachments).
Office Action dated Jul. 6, 2017 in U.S. Appl. No. 15/377,401 (and related attachments).
Office Action dated Apr. 16, 2018 in U.S. Appl. No. 15/088,973.
Office Action dated Mar. 9, 2018 in U.S. Appl. No. 15/377,401.
Decision of Rejection dated Apr. 3, 2018 in Chinese Patent Application No. 201180076029.2.
Decision on Rejection dated Apr. 3, 2018 in Chinese Patent Application No. 201180076029.2, together with partial summarized English translation.
Office Action dated Apr. 17, 2018 in Taiwanese Patent Application No. 105124321, together with partial summarized English translation thereof.
Allowance Decision on Reexamination dated Apr. 17, 2018 in Taiwanese Patent Application No. 105110918.

* cited by examiner

SHARING USER INFORMATION WITH PROXIMATE DEVICES

CROSS REFERENCE TO RELATED APPLICATIONS

The present application is a national phase entry under 35 U.S.C. § 371 of International Application No. PCT/US2011/067591, filed Dec. 28, 2011, entitled "SHARING USER INFORMATION WITH PROXIMATE DEVICES", which designated, among the various States, the United States of America. The Specification of the PCT/US2011/067591 Application is hereby incorporated by reference.

BACKGROUND

Many people find it difficult to meet other people with similar interests, especially in the real world. For example, a person may be sitting in an airport waiting for a flight and have time to kill. That person may have many interests, experiences, backgrounds, and/or social groups in common with other people that are also in the airport and might enjoy the opportunity to meet up with these people. However, even if two people currently find themselves with both the time and inclination to meet and share information, there are few social customs that allow them to do so.

Current social networking and media technologies allow users to share user information with one another. However, users oftentimes must be known to one another in advance in order to make connections through social networking sites and/or services. Further, in order for users to know each other, they must learn about each other's existence first. In the online world, users who may have common interests are sometimes introduced to each other through friends or find each other by being members of common interest groups. However, neither of these tactics addresses the problem of a person wishing to meet new people in the non-virtual world in a time-sensitive fashion.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Methods, apparatuses, and storage media associated with user information sharing between two proximate devices are disclosed herein.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)".

Figure 1:
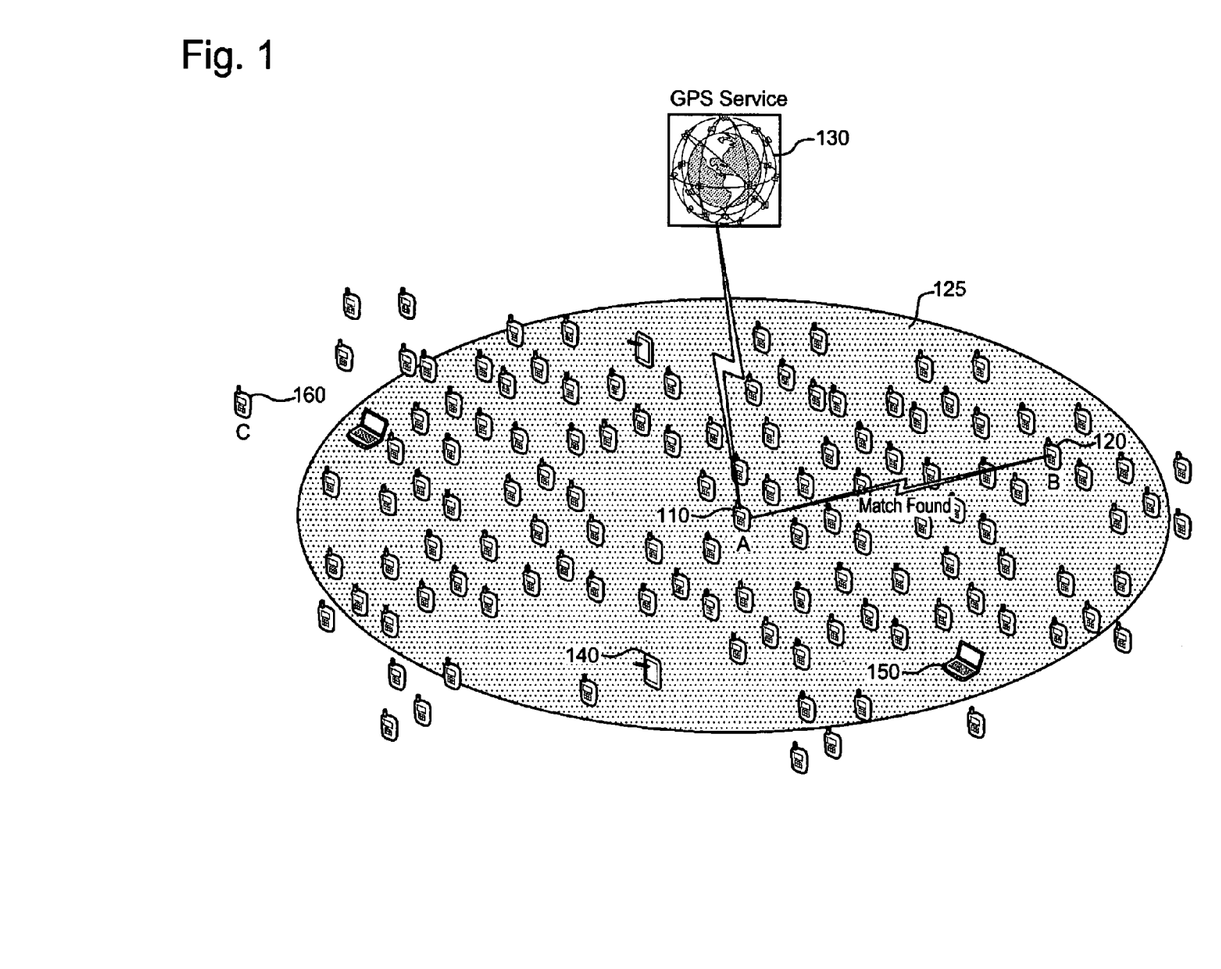
FIG. 1 is a diagram illustrating an overview of user information sharing between two mobile devices.

FIG. 1 is a diagram illustrating user information sharing between two mobile devices, in accordance with various embodiments of the present disclosure. In embodiments, methods, apparatuses, and computer-readable media described herein may allow a user of a device, such as, for example, mobile device 110 to share user information with other devices that are physically proximate to the mobile device 110. For example, as illustrated, in various embodiments, the mobile device 110 may allow its user to share information with proximate mobile device 120. In various embodiments information shared between users may include, but are not limited to, personal information, demographic information, location information, etc. In various embodiments, user information shared may include information that is resident on the device, and/or information that is stored elsewhere, for example, but not limited to, in a social networking site or other online data repository. By sharing information with a proximate device, the user sharing the information may be able to encourage and spark real-world interactions with a user of the proximate device.

In various embodiments, the user of mobile device 110 may be able to share information with one or more devices that are physically proximate to the device 110 within a particular distance. For example, in the illustrated diagram of FIG. 1, mobile device 110 may be configured to share information with any device capable of receiving information within a physical range 125, which may be user configurable. In various embodiments, devices within the range 125 may be determined using one or more location-aware apparatuses or services. For example, the mobile device 110 of FIG. 1 may consult a GPS service 130 in order to identify its location as well as the location of other devices, and thereby determining devices within the range 125. In other embodiments, other location-aware apparatuses and services may be used, such as, but not limited to, Bluetooth, near-field communications ("NFC"), WiFi, digital enhanced cordless telecommunications ("DECT"), etc. In addition, in some embodiments, social networking services that are location aware may be used, such as, for example, Foursquare™ and/or Brightkite™.

While the example of FIG. 1 illustrates information sharing between two mobile devices 110 and 120 that are physically proximate, the present disclosure is not so limited. Thus, for example, in various embodiments information may be shared between the mobile device 110 and the PDA 140 and/or the laptop 150. In various embodiments, as well, information may not be shared if a device is not considered physically proximate to the device sharing information, such as by falling outside of the physical range 125. Thus, in the example of FIG. 1, mobile device 110 may not share information with mobile device 160, as it is outside of the physical range 125.

In various examples, user information may be shared between devices based on a determination that users of the devices having matching interests. "Matching" (and variants of the term) as used herein may include but are not limited to identical, like or complementary. What constitutes "matching" may be application and/or user dependent. Similarly, "interests" (and variants of the term) may include but are not limited to hobbies, skills, education experience, work experience, other background, demographics, common friendships, acquaintanceships, address history, and/or other information. The scope of "interest" may similarly be application and/or user dependent. In various embodiments, upon a determination that an interest match exists between users of two devices, the users of those devices may be made aware of each other in order to potentially share information. Thus, in the illustrated example of FIG. 1, an interest match has been found between devices 110 and 120. These devices may then be identified to their users as having potential for sharing information. In various embodiments, interest matches may be determined through a third party, such as an interest match evaluator (not illustrated). Particular implementations of information sharing are described in greater detail below.

Figure 2:
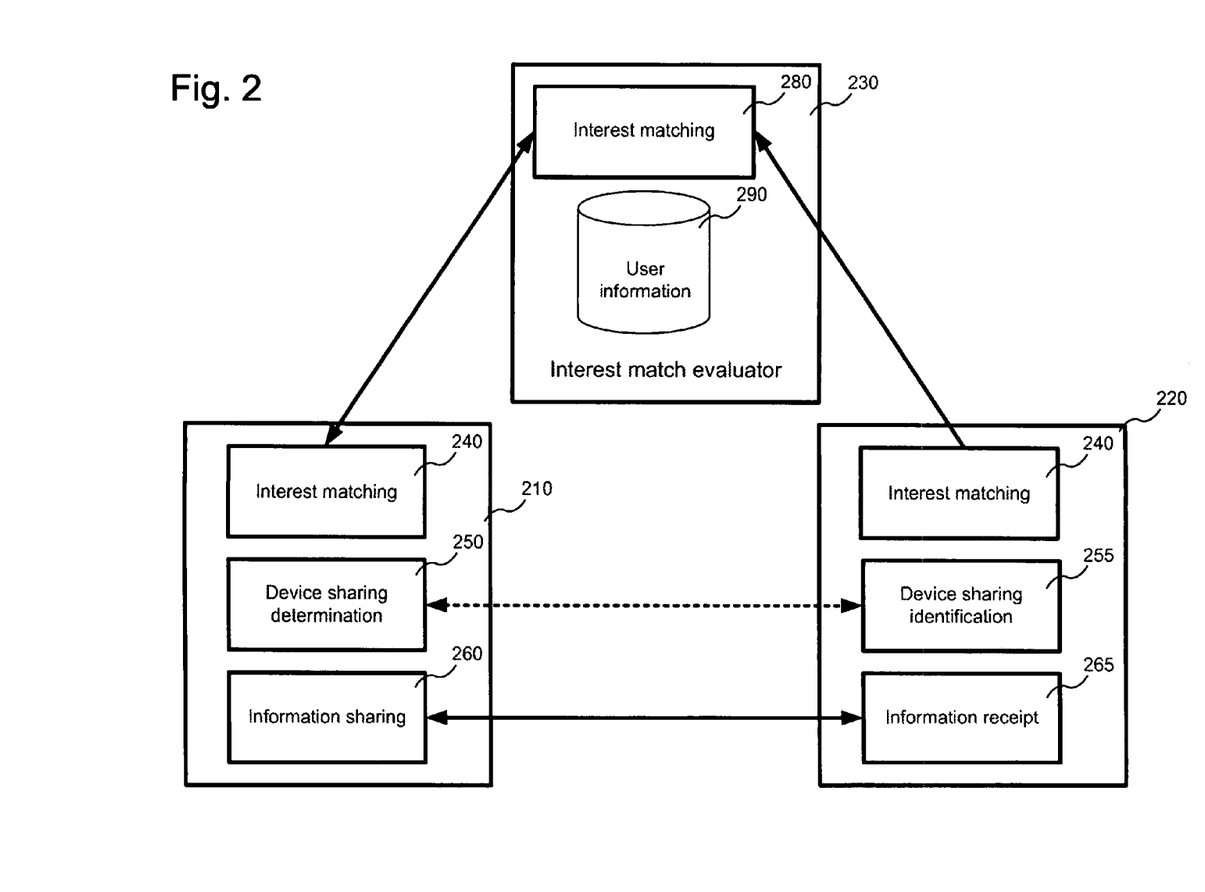
FIG. 2 is a block diagram illustrating user information sharing between two proximate devices using an interest match evaluator, in accordance with various embodiments.

FIG. 2 is a block diagram illustrating user information sharing between a sharing device 210 and a proximate device 220 using an interest match evaluator, in accordance with various embodiments. As discussed above, in various embodiments, the sharing device 210 and the proximate device 220 may include but are not limited to mobile devices, laptops; PDAs, phones, tablet computers, and/or other devices. Additionally, in various embodiments, the sharing device 210 and the proximate device 220 may not necessarily be the same type of device.

In embodiments, the sharing device 210 and the proximate device 220 may include an interest matching module 240. In embodiments, the interest matching module 240 may be configured to receive and/or otherwise identify interests of one or more users of the sharing device 210 and the proximate device 220. In various embodiments, the interest matching module 240 may be configured to identify interests that are maintained locally and/or at remote locations, such as, but not limited to, on a social networking site.

In various embodiments, the interest matching modules 240 of the sharing device 210 and the proximate device 220 may be configured to communicate with an interest match evaluator 230. In various embodiments, the interest match evaluator 230 may include a server or other device that is separate from one or more of the sharing device 210 and the proximate device 220. In various embodiments, the interest match evaluator may be networked with the sharing device 210 and the proximate device 220 in various ways, including, but not limited to, on a local area network, a wide area network, or through the Internet, including as a cloud-based entity. In various embodiments, the interest match evaluator may communicate with the sharing device 210 and the proximate device 220, and in particular with the interest matching modules 240, through various means, including wired and/or wireless networks.

In various embodiments, the interest match evaluator 230 may include an interest matching module 280 that may be configured to determine, for users of the sharing device 210 and the proximate device 220, whether an interest match exists for the users. In various embodiments, the interest matching module 280 may utilize user information stored at from one or more user information stores. In various embodiments, the interest match evaluator 230 may itself include a user information store 280. In various embodiments, the interest match evaluator 230 may utilize remotely-stored user information, such as, but not limited to, user information stored at social networking sites or at other locations. In various embodiments, the interest matching module 280 may be configured with usernames, passwords, and/or other identifying formation that allows the interest matching module 280 to contact, view, and/or store information from these remote locations.

In various embodiments, the sharing device 210 and the proximate device 220 may also respectively include one or more device sharing determination modules 250 and/or device sharing identification modules 255. In various embodiments, the device sharing determination module 250 may determine for a particular device (such as, for example, device 210) that a proximate device (such as, for example, device 220) is configured to receiving user information. In various embodiments, the device sharing determination module 250 may utilize information presented by the device sharing identification module 255 to identify the device (e.g., device 220) as a device that may receive user information. In various embodiments, the device sharing determination module 250 and device sharing identification module 255 may communicate directly with each other, such as over Bluetooth, NFC, DECT, WiFi, or other protocols, so that one device may directly identify that the other device may receive user information. In other embodiments, the devices may communicate through an intermediary, such as, for example, the interest match evaluator 230, in order for the identification to be made. In some embodiments, the device sharing determination module 250 and the device sharing identification module 255 may be the same module implemented on both devices, but performing different tasks. In other embodiments, separate modules may be used.

In various embodiments, the sharing device 210 and the proximate device 220 may also respectively include one or more information sharing modules 260 and/or information receipt modules 265. In various embodiments, the information sharing module 260 may be configured to send user information from a user of the device 210 to the information receipt module 265 for viewing by the user of the second device 265. As discussed herein, in various embodiments, the information sharing module 260 may be configured to share information about a user of the sharing device 210; in other embodiments, the information sharing module 260 may be configured to send one or more messages to the information receipt module 265.

In various embodiments, the information sharing module 260 may also be configured to send a request to send information to the information receipt module 265 for viewing by a user of the second device 265. In various embodiments, the information receipt module 265 may be configured to present the request to a user of the proximate device 220, to receive a response from the user of the proximate device 220 as to whether he or she wants to receive user information from the user of the sharing device 210, and to send that response back to the information sharing module 260. In various embodiments, the request may include information about the user of the first device; this information may be less than all of the information that may be known or accessible to the sharing device 210. For example, the request may only have a name and location for a user of the sharing device 210, so that additional user information may be withheld until the use of the device 220 has approved information sharing. In some embodiments, the information sharing module 260 and the information receipt module 265 may be the same module implemented on both devices, but performing different tasks. In other embodiments, separate modules may be used.

Figure 3:
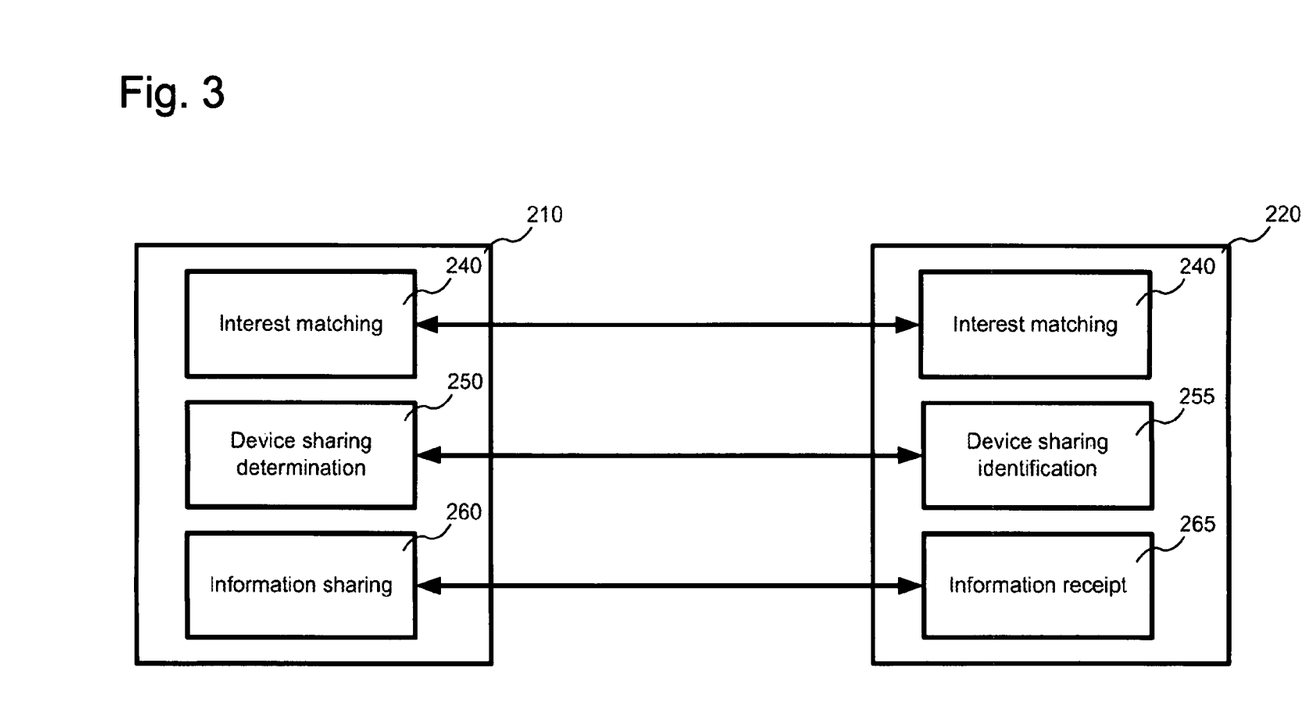
FIG. 3 is a block diagram illustrating user information sharing between two proximate devices, in accordance with various alternative embodiments.

FIG. 3 is a block diagram illustrating user information sharing between two proximate devices, in accordance with various alternative embodiments. In the example embodiments of FIG. 3, the sharing device 210 and the proximate device 220 do not communicate with a separate interest match evaluator 230. Instead, the sharing device 210 and the proximate device 220 may communicate directly, such as through their respective interest matching modules 240, to determine if there is an interest match between users of the respective devices. In various embodiments, this direct communication may be practiced in accordance with other embodiments described herein.

Figure 4:
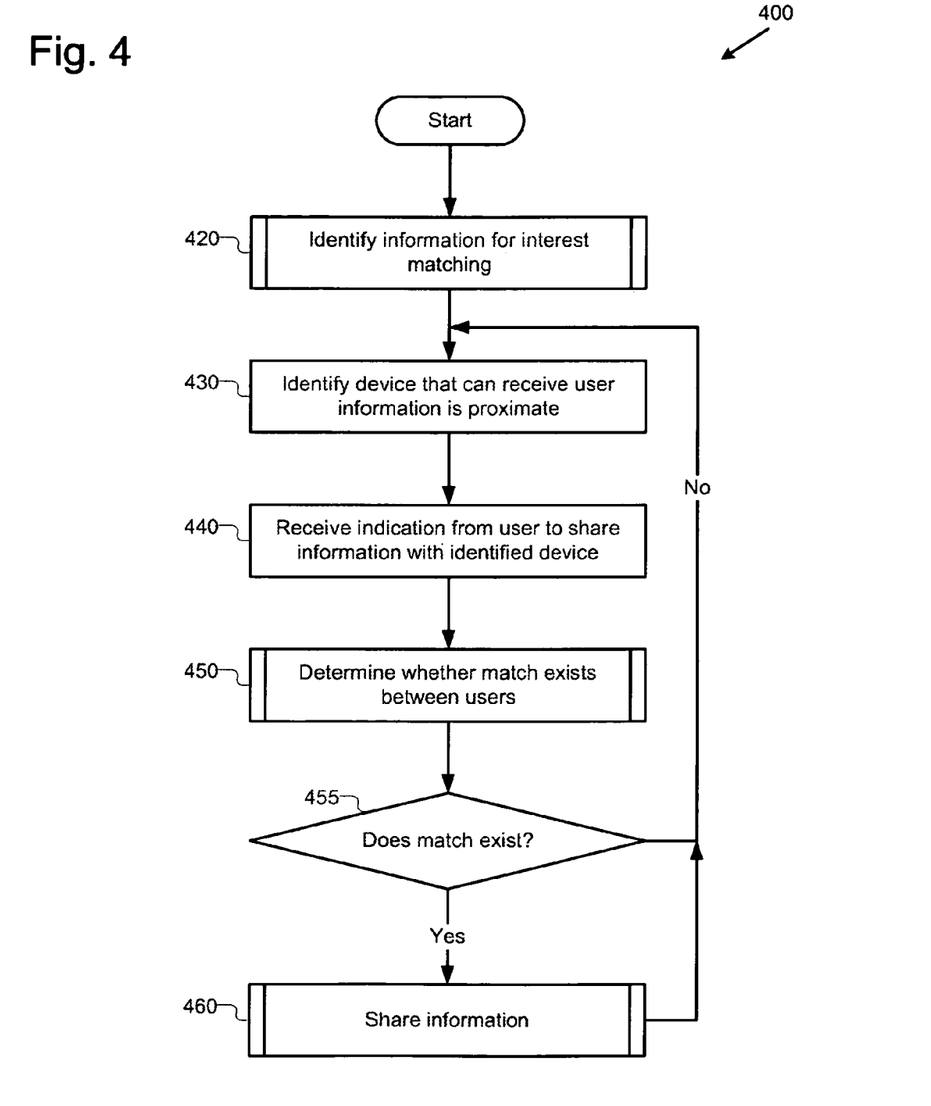
FIG. 4 illustrates an example proximate device identification and user information sharing process, in accordance with various embodiments.

FIG. 4 illustrates an example proximate device identification and user information sharing process 400, in accordance with various embodiments. In various embodiments, process 400 may be performed, in whole or in part, on one or more networked devices, such as the sharing device 210 and the proximate device 220 of FIGS. 2 and 3.

Process 400 may begin at operation 420, where the sharing device 210 may identify information for interest matching. In various embodiments, the information identified at operation 420 may be identified to the sharing device 210 itself, and/or to a separate interest match evaluator 230. Particular implementation examples of operation 420 are described below.

At operation 430, the sharing device 210 may identify a device that can receive user information is proximate to the sharing device 210. In various embodiments, this determination may be performed in different ways. For example, in some embodiments, the sharing device 210 may determine that the proximate device 220 is configured such that it may participate in the user information sharing techniques and communication discussed herein.

In various embodiments, the identification may include identification that the proximate device 220 is actually physically proximate to the sharing device 210. For example, the sharing device 210 may determine that one or more devices that can receive information have checked in to a location-based social networking service, such as, but not limited to, Foursquare™ or Brightkite™. In another example, the sharing device 210 may determine that one or more devices which may receive information are on the same network as sharing device 210, using the same WiFi access point as sharing device 210, and/or are capable of communicating with sharing device 210 using short-distance networking technology such as, but not limited to, Bluetooth, NFC, and/or DECT. In yet another example, the sharing device 210 may report its own location to a third entity, such as by reporting coordinates obtained through GPS or through one of the location-aware services described above, or similar services. In this example, the sharing device 210 may then receive information from the third entity regarding other devices that have sent their location to the entity and are proximate to the device. In various embodiments, these devices may be identified using the device sharing identification module 255, as described above. In various embodiments, the sharing device 210 may, as part of identification, display the identification of the device that can receive user information to a user of the sharing device 210.

Next, at operation 440, the sharing device 210 may receive an indication from a user of the device to share information about the user with the identified device that can receive user information. At operation 450, after receiving this indication to share information, the sharing device 210 may determine whether an interest match exists between a user of the sharing device 210 and the identified device. As described above, in various embodiments, this determination may be performed through direct communication between the two devices. In other embodiments, this determination may be performed through an interest match evaluator 230. Particular implementation examples of operation 450 are described below.

Next, at decision operation 455, the sharing device 210 may determine if an interest match exists (either directly or by receiving a determination from the interest match evaluator 230). If a match does exist, then at operation 460, information may be shared between the devices. Particular implementation examples of operation 460 are described below. After the information is shared, or if a match does not exist, the process may return to operation 430, where a new device that may receive user information may be identified. If no more devices are found, the process may end (not illustrated).

In alternative embodiments, the user may not be presented with an option to indicate that he or she wants to share information until after an interest match is made between the user and the user of the proximate device 220. In such an embodiment, the user of the sharing device may receive fewer requests to share from the sharing device, which may prove less intrusive.

Figure 5:
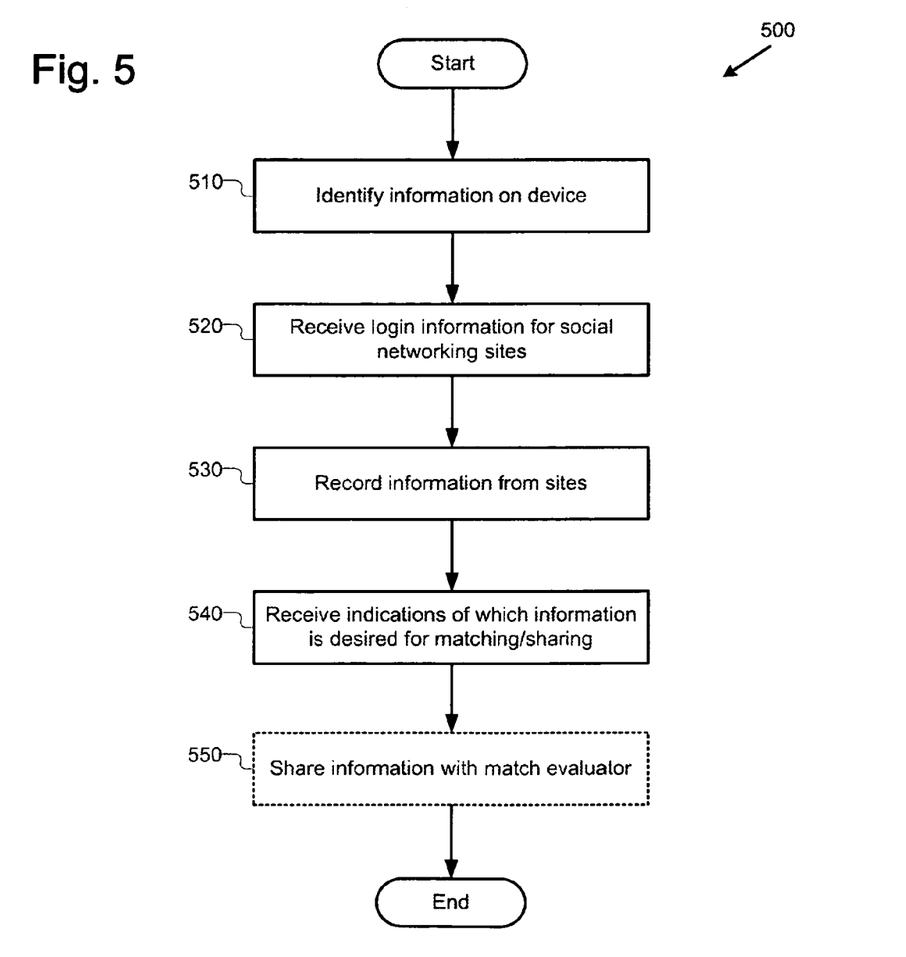
FIG. 5 illustrates an example process for providing user information for interest matching, in accordance with various embodiments.

FIG. 5 illustrates an example process 500 for providing user information for interest matching, in accordance with various embodiments. In various embodiments process 500 may describe one or more implementations of operation 420 of process 400. In various embodiments, process 500 may be performed on sharing device 210; in other embodiments, one or more operations of process 500 may be performed on other devices or entities, such as on a networked information service. The process may begin at operation 510, where the sharing device 210 may identify user information that is located on the device. Such user information may include user information that is directly input into the device for sharing by the sharing device 210 and/or user information that is maintained in other contexts. For example, at operation 510, the sharing device 210 may identify user contact information from a phone book or address book application resident on the device.

At operation 520, the sharing device 210 may receive login information for one or more social networking sites. In various embodiments, this login information may be received after polling a user of the sharing device 210 for the information. At operation 530, the sharing device 210 may log in to the sites for which information was received and record user information obtained from the sites. Next, at operation 540, the sharing device 210 may receive indications from the user of which user information, if any, the user may wish to have used for matching and/or sharing. Thus, in embodiments, the user may select that only a given subset of the information may be used for interest matching or shared with other users. This selection of information may allow the user to customize how private he or she wants to keep his or her information. Then, at operation 550, the sharing device 210 may operationally share the user information that has been obtained and identified as being used for sharing with an interest match evaluator 230. In embodiments where a separate interest match evaluator 230 is not used, operation 550 may not be performed.

Figure 6:
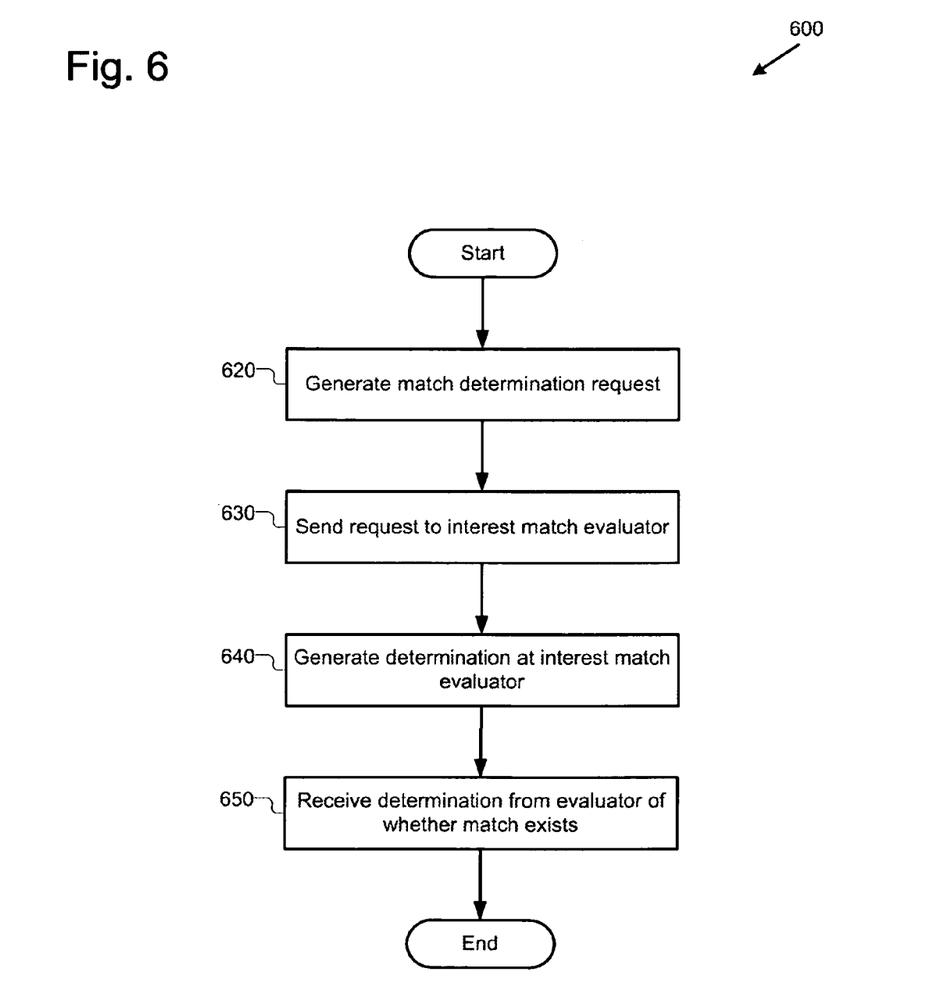
FIG. 6 illustrates an example interest matching determination process, in accordance with various embodiments.

FIG. 6 illustrates an example interest matching determination process 600, in accordance with various embodiments. In various embodiments process 600 may describe one or more implementations of operation 450 of process 400. In various embodiments, one or more operations of process 600 may be performed by the sharing device 210 and/or the interest match evaluator 230. In some embodiments, where no separate interest match evaluator 230 is used, one or more of the operations of process 600 may be performed by the sharing device 210 and/or the proximate device 210.

The process may begin at operation 620, wherein the sharing device 210 may generate an interest match determination request. In some embodiments, the request may be pre-populated by the sharing device 210 with an initial set of information, such as user information identifying the user of the device, information identifying the device itself, and/or information regarding the device and/or user with whom user information is desired to be shared. Next, at operation 630, the generated request may be sent to the interest match evaluator.

At operation 640, the interest match evaluator may determine whether an interest match exists between the user of the sharing device 210 and a user of the proximate device 220. For example, in various embodiments, the interest match evaluator may compare interests of the users to see if there are any matching interests. In various embodiments, the interest match evaluator 230 may compare only that user information for which the users have allowed to be used for interest matching. In some embodiments, the interest match evaluator may, at operation 640, compare friends, colleagues, school mates, acquaintances, and/or contacts of the users to determine if the users have any of these people in common. In various embodiments, the interest match evaluator 230 may generate a determination on the basis of these comparisons. Then, at operation 650, the sharing device 210 may receive the generated determination from the interest match evaluator 230 of whether or not an interest match exists. The process may then end.

As discussed above, in various embodiments, if no separate interest match evaluator is being used, one or more of the operations of process 600 may be performed by the sharing device 210 and/or proximate device 210. Thus, for example, in some embodiments, the sharing device 210 may send the request for matching directly to the proximate device 210 (after recognizing that the proximate device 210 is proximate and receptive to user information sharing). The proximate device 210 may then determine if there is an interest match between the information for users of the two devices and then directly inform the sharing device 210 of whether an interest match was determined to exist. However, in various embodiments, the use of a separate, third-party interest match evaluator 230 may be desired, as such a use facilitates the matching of interests without potentially-sensitive user information being exchanged prematurely between devices.

Figure 7:
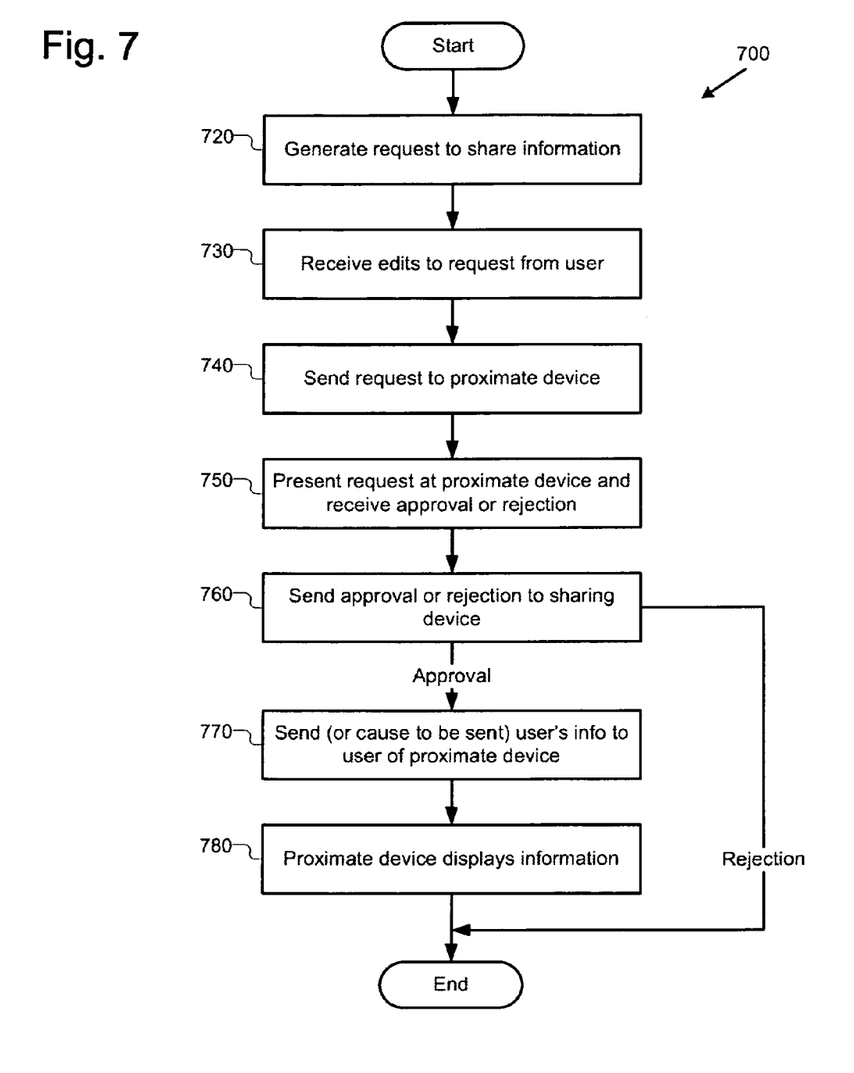
FIG. 7 illustrates an example user information request and sharing process, in accordance with various embodiments.

FIG. 7 illustrates an example user information request and sharing process 700, in accordance with various embodiments. In various embodiments process 700 may describe one or more implementations of operation 460 of process 400. The process may begin at operation 720, wherein the sharing device 210 may generate a request to share user information with the previously-identified proximate device 220. In various embodiments, the sharing device 210 may populate the request with information identifying the user of the sharing device 210, such as, but not limited to, name, location, and so forth. At operation 730, the sharing device 210 may then receive edits to the request from the user of the sharing device 210. In various embodiments, the sharing device 210 may provide a facility, such as a user interface, for the user to review and edit the request before it is sent. Thus, the user may be able to select particular user information for sharing in the request, to omit some or all of the information, and/or to edit the information before the request is sent. Then, at operation 740, the sharing device 210 may send the request to share information to the proximate device 220. In various embodiments, the request may be sent directly to the proximate device 220, or may be sent through an intermediate networking entity.

At operation 750 the proximate device 220 may then present the request to the user of proximate device 210 for approval and receive either approval or rejection of the request. Next, at operation 760, proximate device 210 may send the approval or rejection to the sharing device 210. In various embodiments, if the request is rejected, the process may then end. However, if the request is approved, then at operation 770, the sharing device 210 may send user information to the proximate device. In various embodiments, the sharing device 210 may also cause user information to be sent to the proximate device. For example, the sharing device 210, may connect to one or more social networks or other services and cause the social networks to themselves send user information to the proximate device 220. In various embodiments, the information shared at operation 770 may constrained to only that information that the user of sharing device 210 indicated that he or she wished to be shared. After the information is sent, at operation 780, the proximate device 220 may then display the information, allowing the users of the two devices to share the information and to connect, both on the devices and, possibly, in the physical world. The process may then end.

Figure 8:
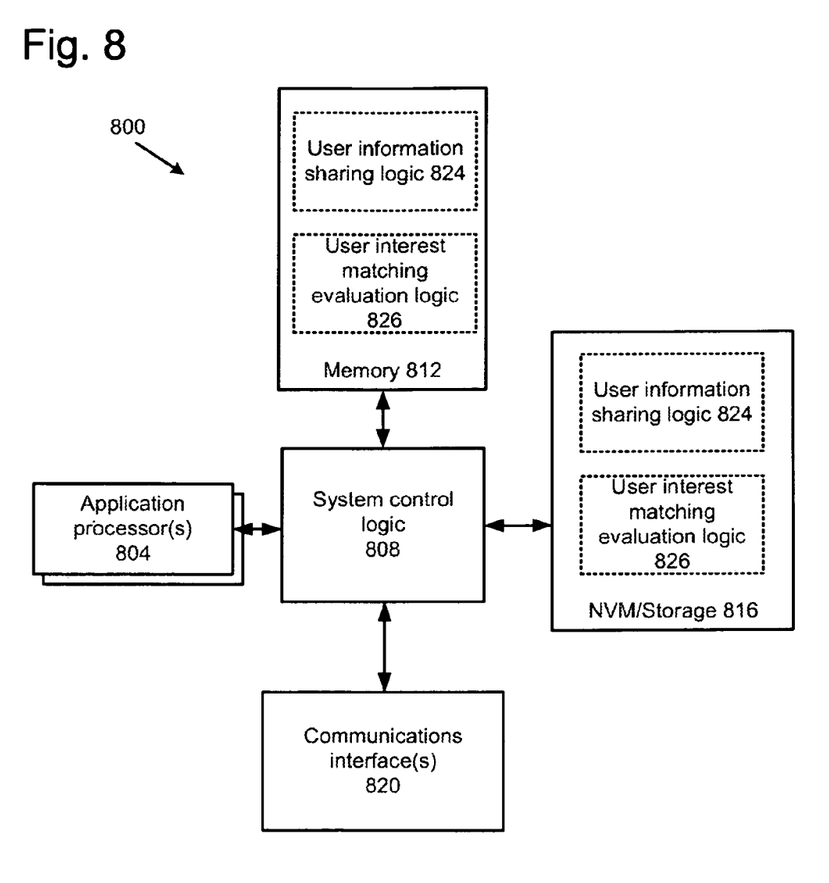
FIG. 8 illustrates an example computing environment, in accordance with various embodiments.

The techniques and apparatuses described herein may be implemented into a system using suitable hardware, firmware, and/or software to configure as desired. FIG. 8 illustrates, for one embodiment, an example system 800 including at least processors 804, each having one or more processor cores, system control logic 808 coupled to at least one of the processors 804, memory 812 coupled to system control logic 808, non-volatile memory ("NVM")/storage 816 coupled to system control logic 808, and one or more communications interface(s) 820 coupled to system control logic 808. In various embodiments, the system 800 may include components of a CPU-based software system, a management engine system, or a combination of the two.

System control logic 808 for one embodiment may include any suitable interface controllers to provide for any suitable interface to at least one of the processors 804 and/or to any suitable device or component in communication with system control logic 808. The processors may include a dedicated application processor upon which an application environment may be operated, as well as a separate service processor upon which a manageability engine may be operated. The system may include additional processors or processing cores (not illustrated).

System control logic 808 for one embodiment may include one or more memory controller(s) to provide an interface to memory 812. System memory 812 may be used to load and store data and/or instructions, for example, for system 800. System memory 812 for one embodiment may include any suitable non-transitory computer-readable volatile memory, such as suitable dynamic random access memory (DRAM), for example.

System control logic 808 for one embodiment may include one or more input/output (I/O) controller(s) to provide an interface to NVM/storage 816 and communications interface(s) 820.

NVM/storage 816 may be used to store data and/or instructions, for example. NVM/storage 816 may include any suitable non-transitory computer-readable non-volatile memory, such as flash memory, for example, and/or may include any suitable non-volatile storage device(s), such as one or more hard disk drive(s) (HDD(s)), one or more solid-state drive(s), one or more compact disc (CD) drive(s), and/or one or more digital versatile disc (DVD) drive(s), for example.

The NVM/storage 816 may include a storage resource physically part of a device on which the system 800 is installed or it may be accessible by, but not necessarily a part of, the device. For example, the NVM/storage 816 may be accessed over a network via the communications interface(s) 820.

Memory 812 and NVM/storage 816 may include, in particular, temporal and persistent copies of logic, respectively. In the illustrated example, this logic may include user information sharing logic 824 and/or user interest matching evaluation logic 826. The user information sharing logic 824 and/or user interest matching evaluation logic 826 may include instructions that, when executed by at least one of the processors 804, may cause system 800 to perform some or all of the operations associated with processes 400, 500, 600, and 700. In some embodiments, the user information sharing logic 824 and/or user interest matching evaluation logic 826 may additionally/alternatively be located in the system control logic 808.

Communications interface(s) 820 may provide an interface for system 800 to communicate over one or more network(s) and/or with any other suitable device. Communications interface(s) 820 may include any suitable hardware and/or firmware. Communications interface(s) 820 for one embodiment may include, for example, a network adapter, a wireless network adapter, a telephone modem, and/or a wireless modem. For wireless communications, communications interface(s) 820 for one embodiment may use one or more antenna(s).

For one embodiment, at least one of the processor(s) 804 may be packaged together with information sharing logic 824 and/or user interest matching evaluation logic 826. For one embodiment, at least one of the processor(s) 804 may be packaged together with 1 information sharing logic 824 and/or user interest matching evaluation logic 826 to form a System in Package (SiP). For one embodiment, at least one of the processor(s) 804 may be integrated on the same die with information sharing logic 824 and/or user interest matching evaluation logic 826. For one embodiment, at least one of the processor(s) 804 may be integrated on the same die with information sharing logic 824 and/or user interest matching evaluation logic 826 to form a System on Chip (SoC). For at least one embodiment, the SoC may be utilized in a smart phone, cell phone, tablet, or other mobile device.

In various embodiments, system 800 may have more or less components, and/or different architectures.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

Although specific, embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

ADDITIONAL NOTES AND EXAMPLES

Example 1 may include subject matter computer-readable media including instructions configured to cause a first computing device, in response to execution of the instructions by the first computing device, to identify a second device that is proximate to the first device that is configured to receive requests for information sharing. The instructions may also cause the first computing device to send a request to the second device to share information about a first user of the first device with a second user of the second device, on determination that the first user and the second user satisfy the one or more matching criteria. The instructions may also cause the first computing device to send, or cause to be sent, information about the first user to the second device.

In Example 2, the subject matter of Example 1 may optionally include the instructions causing the first computing device to send a request to a third device for a determination from the third device that the first user and the second user satisfy the one or more matching criteria and to receive a determination from the third device on whether receive a determination from the third device comprises receive a determination from the third device that the first user and the second user satisfy one or more matching criteria.

In Example 3, the subject matter of Examples 1 and 2 may optionally include the instructions causing the first computing device to detect that the second device is proximate to the first device.

In Example 4, the subject matter of any of the preceding Examples may optionally include the instructions causing the first computing device to determine that the first user and the second user have an interest in common.

In Example 5, the subject matter of any of the preceding Examples may optionally include the instructions causing the first computing device to determine that the first user and the second user satisfy one or more matching criteria comprises a determination that the first user and the second user have a friend, colleague, school mate, acquaintance, or contact in common.

In Example 6, the subject matter of any of the preceding Examples may optionally include the instructions causing the first computing device to send a request to the second device for a determination on whether the first and the second users have mutual desire to share information and to jointly determine with the second device whether the first and the second users have mutual desire to share information.

In Example 7, the subject matter of any of the preceding Examples may optionally include the instructions causing the first computing device to receive permission from the second device to share information about the first user.

In Example 8, the subject matter of any of the preceding Examples may optionally include the instructions causing the first computing device to send information about the first user to the second device, in response to receipt of permission from the second device.

In Example 9, the subject matter of any of the preceding Examples may optionally include the instructions causing the first computing device to send information about the first user, obtained from one or more social networks, to the second device.

In Example 10, the subject matter of any of the preceding Examples may optionally include the instructions causing the first computing device to cause to be sent information about the first user to the second device from one or more social networks.

In Example 11, the subject matter of any of the preceding Examples may optionally include the instructions causing the first computing device to send a subset of information about the first user to the second user.

In Example 12, the subject matter of any of the preceding Examples may optionally include the first device, and/or second device including one of a laptop, desktop, or mobile device.

In Example 13, the subject matter of any of the preceding Examples may optionally include the computer-readable media including memory or a non-volatile storage device.

Example 14 may include a computer-implemented method performed on a first computing device to perform any one or more of the operations described in any of the preceding examples.

Example 15 may include an apparatus configured to perform any one or more of the operations described in any of the preceding examples.

Example 16 may include one or more computer-readable storage media comprising instructions configured to cause a first computing device, in response to execution of the instructions by the first computing device, to receive a request from a second device that is proximate to a third device, wherein the request asks for a determination on whether a first user of the second device may wish to send information about the first user to a second user of the third device. The instructions may also cause the first computing device to send a determination on whether the first user should send the information.

In Example 17, the subject matter of Example 16 may include instructions causing the first computing device to determine that the first user and the second satisfy one or more matching criteria.

In Example 18, the subject matter of any one of Examples 16 or 17 may include instructions causing the first computing device to determine that the first user and the second user have an interest in common.

In Example 19, the subject matter of any one of Examples 16-18 may include instructions causing the first computing device to determine that the first user and the second user have a friend, colleague, school mate, or contact in common.

Example 20, may include an apparatus configured to perform any one or more of the operations described in any of Examples 16-19.

Example 21 may include a computer-implemented method performed on a first computing device to perform any one or more of the operations described i n any of Examples 16-19.

What is claimed is:

1. One or more non-transitory computer-readable storage media comprising instructions to be executed by a first computing device, the first computing device being capable of being used in association with a second device and a third device, the instructions when executed by the first device resulting in the first device being capable of performing operations comprising:

identifying a second device that is proximate to the first device that is to receive at least one request for information sharing;

sending the at least one request to the second device to share information about a first user of the first device with a second user of the second device, in response at least in part to a determination that the first user and the second user satisfy one or more matching criteria, wherein the one or more matching criteria includes matching criteria for information related to the respective users stored at one or more social networking sites; and in response, at least in part, to approval of the at least one request by the second user of the second device:

sending and/or causing to be sent information about the first user to the second device; and connecting by the first device to at least one social network to cause the at least one social network to send other information about the first user to the second user of the second device, the other information being desired to be shared with the second user by the first user;

wherein to determine the first user and the second user satisfy the one or more matching criteria includes: to send at least one other request to the third device, the third device being separate and distinct from the first device and the second device, the at least one other request being for a determination from the third device that the first user and the second user satisfy the one or more matching criteria; and to receive a determination from the third device on whether the first user and the second user satisfy one or more matching criteria; and also wherein:

the first device is capable of receiving, in operation of the first device, at least one privacy customization indication from the first user to indicate which portion of user information of the first user is to be used for interest matching and for sharing with the second user;

in the operation of the first device, the first device is capable of permitting user review and user editing, at least in part, of the request that is to be sent to the second device, prior to transmission of the request that is to be sent to the second device, so as to permit user selection of particular user information to be shared in the request that is to be sent to the second device, and after the user editing, the first device is capable of sending the request, as edited, directly from the first device to the second device instead of via an intermediate networking entity;

the determination that the first user and the second user satisfy the one or more matching criteria is to be performed by a remote server-based interest match evaluator;

the remote server-based interest match evaluator is configured with user name and password information to permit the remote server-based interest match evaluator to be able to obtain remotely-stored information;

the remotely-stored information comprises social network information that is stored remotely from the remote server-based interest match evaluator, the first device, and the second device;

the first device is to determine whether the second device has a configuration that is capable of permitting the second device to participate in the information sharing;

the first device is to determine whether the second device is capable of using the same wireless access point as the first device is capable of using;

the request, prior to the user review and user editing, is to be pre-populated by the first device with an initial information set that identifies a name of the first user, first user location, the first device itself, and the second user.

2. The one or more non-transitory computer-readable media of claim 1, wherein the operations further comprise detecting that the second device is proximate to the first device.

3. The one or more non-transitory computer-readable media of claim 1, wherein the determination that the first user and the second user satisfy the one or more matching criteria comprises determining that the first user and the second user have an interest in common.

4. The one or more non-transitory computer-readable media of claim 1, wherein the determination that the first user and the second user satisfy the one or more matching criteria comprises determining that the first user and the second user have a friend, colleague, school mate, acquaintance, or contact in common.

5. The one or more non-transitory computer-readable media of claim 1, wherein the operations further comprise:
requesting that the second device determine whether the first and second users have mutual desire to share information; and
jointly determining with the second device whether the first and the second users have mutual desire to share information.

6. The one or more non-transitory computer-readable media of claim 5, wherein the operations further comprise receiving permission from the second device to share information about the first user.

7. The one or more non-transitory computer-readable media of claim 5, wherein the operations further comprise sending information about the first user, obtained from one or more social networks, to the second device.

8. The one or more non-transitory computer-readable media of claim 5, wherein the operations further comprise causing to be sent information about the first user to the second device from one or more social networks.

9. An apparatus that is capable of being used in association with both a device proximate to the apparatus and a third device, the apparatus comprising:
a computer processor;
a device sharing determination module to operate on the computer processor to identify the device proximate to the apparatus that is to receive at least one request for information sharing;
an information sharing module to operate on the computer processor to:
send the at least one request to the device proximate to the apparatus to share information about a first user of the apparatus with a second user of the device proximate to the apparatus in response at least in part to determination that the first user and the second user satisfy one or more matching criteria, wherein the one or more matching criteria includes matching criteria for information related to the respective users stored at one or more social networking sites;
in response at least in part to approval of the at least one request by the second user of the device proximate to the apparatus, the information sharing module is to operate on the computer processor to:
send, and/or cause to be sent, information about the first user to the device proximate to the apparatus; and
connect by the apparatus to at least one social network to cause the at least one social network to send other information about the first user to the second user of the device proximate to the apparatus, the other information being desired to be shared with the second user by the first user;
wherein to determine the first user and the second user satisfy the one or more matching criteria includes: to send at least one other request to the third device, the third device being separate and distinct from the apparatus and the device proximate to the apparatus, the at least one other request being for a determination from the third device that the first user and the second user satisfy the one or more matching criteria; and to receive a determination from the third device on whether the first user and the second user satisfy one or more matching criteria; and
also wherein:
the apparatus is capable of receiving, in operation of the apparatus, at least one privacy customization indication from the first user to indicate which portion of user information of the first user is to be used for interest matching and for sharing with the second user;
in the operation of the apparatus, the apparatus is capable of permitting user review and user editing, at least in part, of the request that is to be sent to the device proximate to the apparatus, prior to transmission of the request that is to be sent to the device proximate to the apparatus, so as to permit user selection of particular user information to be shared in the request that is to be sent to the device proximate to the apparatus, and after the user editing, the apparatus is capable of sending the request, as edited, directly from the apparatus to the device proximate to the apparatus instead of via an intermediate networking entity;

the determination that the first user and the second user satisfy the one or more matching criteria is to be performed by a remote server-based interest match evaluator;

the remote server-based interest match evaluator is configured with user name and password information to permit the remote server-based interest match evaluator to be able to obtain remotely-stored information;

the remotely-stored information comprises social network information that is stored remotely from the remote server-based interest match evaluator, the apparatus, and the device proximate to the apparatus;

the apparatus is to determine whether the device proximate to the apparatus has a configuration that is capable of permitting the device proximate to the apparatus to participate in the information sharing;

the apparatus is to determine whether the device proximate to the apparatus is capable of using the same wireless access point as the apparatus is capable of using;

the request, prior to the user review and user editing, is to be pre-populated by the apparatus with an initial information set that identifies a name of the first user, first user location, the apparatus, and the second user.

10. The apparatus of claim 9, further comprising an interest matching module to operate on the computer processor to determine if whether the first user would desire to send information to the second user.

11. The apparatus of claim 9, wherein the information sharing module is further to receive permission from the third device to share information about the first user with the device proximate to the apparatus.

12. The apparatus of claim 9, wherein the device sharing determination module is further to operate on the computer processor to detect that the device is physically proximate to the apparatus.

13. The apparatus of claim 9, wherein the apparatus and/or the device proximate to the apparatus comprise a laptop, desktop, or mobile device.

14. A computer-implemented method implemented, at least in part, by a first computing device, the first computing device being capable of being used in association with a second computing device and a third device, the method comprising:

identifying, by the first computing device, that the second computing device is proximate to the first device and is to receive at least one request for information sharing;

sending the at least one request from the first computing device to the second computing device to share information about a first user of the first device with a second user of the second computing device, in response at least in part to a determination that the first user and the second user satisfy one or more matching criteria, wherein the one or more matching criteria includes matching criteria for information related to the respective users stored at one or more social network sites; and in response at least in part to approval of the at least one request by the second user of the second device:

sending and/or causing to be sent, by the first computing device, information about the first user to the second computing device; and connecting by the first device to at least one social network to cause the at least one social network to send other information about the first user to the second user of the second device, the other information being desired to be shared with the second user by the first user;

wherein to determine the first user and the second user satisfy the one or more matching criteria includes: to send at least one other request to the third device, the third device being separate and distinct from the first computing device and the second computing device, the at least one other request being for a determination from the third device that the first user and the second user satisfy the one or more matching criteria; and to receive a determination from the third device on whether the first user and the second user satisfy one or more matching criteria; and also wherein:

the first device is capable of receiving, in operation of the first device, at least one privacy customization indication from the first user to indicate which portion of user information of the first user is to be used for interest matching and for sharing with the second user;

in the operation of the first device, the first device is capable of permitting user review and user editing, at least in part, of the request that is to be sent to the second device, prior to transmission of the request that is to be sent to the second device, so as to permit user selection of particular user information to be shared in the request that is to be sent to the second device, and after the user editing, the first device is capable of sending the request, as edited, directly from the first device to the second device instead of via an intermediate networking entity;

the determination that the first user and the second user satisfy the one or more matching criteria is to be performed by a remote server-based interest match evaluator;

the remote server-based interest match evaluator is configured with user name and password information to permit the remote server-based interest match evaluator to be able to obtain remotely-stored information;

the remotely-stored information comprises social network information that is stored remotely from the remote server-based interest match evaluator, the first device, and the second device;

the first device is to determine whether the second device has a configuration that is capable of permitting the second device to participate in the information sharing;

the first device is to determine whether the second device is capable of using the same wireless access point as the first device is capable of using;

the request that is to be sent to the second device, prior to the user review and user editing, is to be pre-populated by the first device with an initial information set that identifies a name of the first user, first user location, the first device itself, and the second user.

15. The method of claim 14, further comprising:

sending, by the first computing device, a request to a third device for a determination on whether the first user and the second user satisfy one or more matching criteria; and receiving, by the first computing device, a determination from the third device on whether the first user and the second user satisfy one or more matching criteria.

16. One or more non-transitory computer-readable storage media comprising instructions to be executed by a first computing device, the first computing device being capable of being used in association with a second device and a third device, the instructions when executed by the first device resulting in the first device being capable of performing operations comprising:

receiving at least one request from the second device, the second device being proximate to the third device, the at least one request asking for a determination on whether a first user of the second device may wish to send information about the first user to a second user of the third device, wherein the determination is based at least on matching criteria for information related to the first user and second user stored at one or more social networking sites; and sending a determination on whether the first user should send the information; and wherein:
the second device is capable of receiving, in operation of the second device, at least one privacy customization indication from the first user to indicate which portion of user information of the first user is to be used for interest matching and for sharing with the second user;

in the operation of the second device, the second device is capable of permitting user review and user editing, at least in part, of the at least one request that is to be sent to the third device, prior to transmission of the request that is to be sent to the third device, so as to permit user selection of particular user information to be shared in the request that is to be sent to the third device, and after the user editing, the second device is capable of sending the at least one request, as edited, directly from the second device to the third device instead of via an intermediate networking entity;

in response at least in part to approval by the second user of the third device of at least one other request for information sharing, the second device is to connect to at least one social network to cause the at least one social network to send other information about the first user to the second user of the third device, the other information being desired to be shared with the second user by the first user;

the determination is to be performed by a remote server-based interest match evaluator;

the remote server-based interest match evaluator is configured with user name and password information to permit the remote server-based interest match evaluator to be able to obtain remotely-stored information;

the remotely-stored information comprises social network information that is stored remotely from the remote server-based interest match evaluator, the second device, and the third device;

the second device is to determine whether the third device has a configuration that is capable of permitting the third device to participate in the information sharing;

the second device is to determine whether the third device is capable of using the same wireless access point as the second device is capable of using;

the at least one other request, prior to the user review and user editing, is to be pre-populated by the second device with an initial information set that identifies a name of the first user, first user location, the second device itself, and the second user.

17. The one or more non-transitory computer-readable media of claim 16, wherein the operations further comprise determining that the first user and the second user satisfy one or more matching criteria.

18. The one or more non-transitory computer-readable media of claim 17, wherein the determination that the first user and the second user satisfy one or more matching criteria comprises determining that the first user and the second user have an interest in common.

19. The one or more non-transitory computer-readable media of claim 17, wherein the determination that the first user and the second user satisfy one or more matching criteria comprises determining that the first user and the second user have a friend, colleague, school mate, or contact in common.

20. An apparatus usable in association with a first device and a second device, the apparatus comprising:

a computer processor; and an interest match evaluator to operate on the computer processor to:
receive a request from the first device, the first device being proximate to the second device, the request asking for a determination on whether a first user of the first device may wish to send information about the first user to a second user of the second device, wherein the determination is based at least on matching criteria for information related to the respective users of the first device and the second device stored at one or more social networking sites; and send a determination on whether the first user should send the information; and wherein:
the first device is capable of receiving, in operation of the first device, at least one privacy customization indication from the first user to indicate which portion of user information of the first user is to be used for interest matching and for sharing with the second user;

in the operation of the first device, the first device is capable of permitting user review and user editing, at least in part, of at least one information sharing request that is to be sent to the second device, prior to transmission of the at least one information sharing request that is to be sent to the second device, so as to permit user selection of particular user information to be shared in the at least one information sharing request that is to be sent to the second device, and after the user editing, the first device is capable of sending the at least one information sharing request, as edited, directly from the first device to the second device instead of via an intermediate networking entity; and in response at least in part to approval by the second user of the second device of the at least one information sharing request, the first device is to connect to at least one social network to cause the at least one social network to send other information about the first user to the second user of the second device, the other information being desired to be shared with the second user by the first user;

the determination is to be performed by a remote server-based interest match evaluator;

the remote server-based interest match evaluator is configured with user name and password information to permit the remote server-based interest match evaluator to be able to obtain remotely-stored information;

the remotely-stored information comprises social network information that is stored remotely from the remote server-based interest match evaluator, the first device, and the second device;

the first device is to determine whether the second device has a configuration that is capable of permitting the second device to participate in information sharing;

the first device is to determine whether the second device is capable of using the same wireless access point as the first device is capable of using;

the at least one information sharing request, prior to the user review and user editing, is to be pre-populated by the first device with an initial information set that identifies a name of the first user, first user location, the first device itself, and the second user.

21. The apparatus of claim 20, further comprising a user information storage to store user information to be used in matching interests.

\* \* \* \* \*